United States Patent [19]
Junell

[11] Patent Number: 5,953,649
[45] Date of Patent: Sep. 14, 1999

[54] SIGNAL ACQUISITION IN A SATELLITE TELEPHONE SYSTEM

[75] Inventor: Jari Junell, Vantaa, Finland

[73] Assignee: Nokia Mobile Phones, Ltd., Espoo, Finland

[21] Appl. No.: 08/859,500

[22] Filed: May 20, 1997

[30] Foreign Application Priority Data

May 21, 1996 [FI] Finland ..................................... 962139

[51] Int. Cl.⁶ ........................................................ H04Q 7/20
[52] U.S. Cl. ..................... 455/404; 455/54.1; 455/13.1; 455/67.6; 370/95.3; 370/106.1
[58] Field of Search ..................... 455/404, 425, 455/437, 536, 507, 67.1, 67.6; 370/335, 332, 105.1, 105.4; 375/1, 115

[56] References Cited

U.S. PATENT DOCUMENTS

| | | | |
|---|---|---|---|
| 4,168,398 | 9/1979 | Matsuo et al. | 178/69.1 |
| 4,701,934 | 10/1987 | Jasper | 375/1 |
| 5,214,687 | 5/1993 | Kansakoski et al. | 379/60 |
| 5,276,691 | 1/1994 | Kivari | 371/47.1 |
| 5,373,507 | 12/1994 | Skold | 370/105.1 |
| 5,479,444 | 12/1995 | Malkamaki et al. | 375/231 |
| 5,553,077 | 9/1996 | Martinez Garcia et al. | 370/95.3 |
| 5,613,195 | 3/1997 | Ooi | 455/13.1 |
| 5,648,991 | 7/1997 | Namekata et al. | 375/341 |
| 5,703,873 | 12/1997 | Ojanpera et al. | 370/332 |
| 5,710,796 | 1/1998 | Jarvela et al. | 375/344 |
| 5,838,672 | 11/1998 | Ranta | 370/335 |

FOREIGN PATENT DOCUMENTS

| | | |
|---|---|---|
| 0419380 A1 | 3/1991 | European Pat. Off. . |
| 07250120 | 9/1995 | Japan . |

*Primary Examiner*—Wellington Chin
*Assistant Examiner*—Pablo N. Tran
*Attorney, Agent, or Firm*—Perman & Green, LLP

[57] ABSTRACT

In a telecommunications system, where the receiver must find a signal arranged in a regular pattern in frame periods (10) and further in slots (11) from among several possible frequencies, there is applied a two-step synchronisation procedure. In the first step (20), the receiver records a sample sequence (30) having the length of two frame periods and a sampling ratio of 1/1, and calculates on the basis of this an estimate sequence (32), where each estimate is a sliding average of N successive samples, and N is the number of symbols contained by one slot. The largest estimates (35, 36, 37, 38) correspond to those bursts of the detected signal that have the highest power; on the basis of them, there is calculated a coarse frame synchronisation at the accuracy of 30 symbols. In the second step (24), in each recorded frame there is detected a given reference sequence (14;43) by looking for a sequence of successive samples that best correlates with the known form (43) of the reference sequence. If the location of the found reference sequences is equal, in both frames, with sufficient accuracy, the signal is found.

15 Claims, 6 Drawing Sheets

SIGNAL ACQUISITION IN A SATELLITE TELEPHONE SYSTEM

BACKGROUND OF THE INVENTION

The invention relates in general to the operation of a receiver in order to find the electric signal to be received, and in particular to the utilisation of a control signal provided in a predetermined rhythmic pattern in a situation where the receiver must find the signal among several possible frequencies and synchronise the reception according to the signal properties.

In such radio communications systems that have several data transmission frequencies and variable uses with respect to area and/or time, the receiver must, prior to beginning the reception proper, find the desired signal and synchronise its operation in order to interpret the content of the signal. Finding the signal means that the receiver is tuned to exactly that frequency where the signal is located. In the synchronisation process the receiver must find out where each separate symbol pertaining to the signal begins, and at what rate the signals succeed to each other.

The present application pays special attention to the I-CO Global Communications satellite telephone system, which is based on ten communications satellites with a so-called medium-high orbit (roughly 10,000 km). The satellites orbit the earth at regular intervals on two mutually perpendicular orbits with an inclination of 45°. Each satellite comprises an antenna arrangement with a power pattern of 121 narrow radiation lobes, which together cover the coverage area of said satellite on earth. The coverage area means the whole area from which the satellite is seen more than 10 degrees above the horizon. The operational frequency range of the system is roughly 2 GHz, and it utilises TDMA, Time Division Multiple Access.

As a concept, the system defines a so-called CCS carrier (Common Channel Signalling), which means a given carrier frequency reserved for signal acquisition, synchronisation and distribution of general communications information. Globally there are reserved 120 frequencies for CCS carriers, and these frequencies are further grouped into regional and local frequencies. When a certain satellite moves on its orbit, its coverage area moves along the surface of the earth. The satellite changes the transmitted CCS frequencies in between the separate radiation lobes, so that in a given geographic area, there are always received the same frequencies. A receiver located on earth or near the surface of the earth stores the eight location-connected local CCS frequencies to a non-volatile memory; consequently, when it is switched off and back on, it searches a signal from among said eight frequencies. If a signal is not found, the receiver next studies the 40 regional frequencies, and if there still is no signal, finally all 120 global frequencies.

According to FIG. 1, a transmission with each CCS frequency consists of several multiframes 10, which are divided into 25 slots 11. Each slot includes 120 symbols 12. According to current definitions, the symbol rate in the system is 18,000 symbols per second, but it may be increased to 36,000 symbols per second in the future. The first slot in the frame comprises a BCCH (Broadcast Control Channel) burst 13, which is BPSK (Binary Phase Shift Keying) modulated and contains, among others, communications data and a 32 symbols long reference sequence 14, which is important for synchronisation. The location and form of the reference sequence inside the BCCH burst will be essentially fixed and known. Two successive slots contain a FCH (Frequency Channel) burst 15, which is transmitted with a somewhat lower frequency than the BCCH burst and consists of pure sinus wave at the frequency of said CCS carrier; the purpose of said FCH burst 15 is to aid the synchronisation of the receiver. Other slots in the CCS carrier are empty.

For successful reception, the receiver must, after being switched on, first find the desired signal. General criteria for the signal to be found is that the timing error in the reception is $\pm\frac{1}{2}$ symbols at the most, and that the frequency error is no more than a few percentages of the symbol rate. The nearer to zero these two error factors are, the smaller the probability that bit errors happen in the reception, and the less the reception is sensitive to the deterioration of the SIN ratio. In the prior art, there are known several methods for treating, i.e. scanning, a given number of frequencies in order to detect at what frequency or what frequencies transmission exists. As for the satellite telephone system discussed here, it has been generally suggested that the receiver observes the power profile in the frame scale with the found CCS frequency and assumes that the peak of the power profile corresponds to a BCCH burst. Thereafter the receiver picks a discrete sample series of the FCH burst and calculates therefrom a 128-sample long fast Fourier transform (FFT), the results of which are used in the coarse correction of frequency error. Detailed algorithms for carrying out frame synchronisation and eliminating frequency errors have not been given by the time of filing this application.

SUMMARY OF THE INVENTION

The object of the present invention is to introduce a method for signal acquisition, frame synchronisation and elimination of frequency errors in a multi-frequency communications system by utilising a transmission which is in advance arranged to a certain rhythmic pattern on a given control channel. Another object of the invention is to achieve a system which operates quickly and reliably in varying reception conditions and can adapt itself to changing conditions.

These objects are achieved by means of a stepwise method which proceeds frequency by frequency, by recording a given length of the power profile mixed to the baseband of the nominal carrier frequency and filtered, and if a frame synchronisation is found in said recorded section, the frequency correction is calculated by using the Fourier transform on the basis of the frequency data part of the signal and by adjusting the synchronisation to be more accurate by searching a given signal part for the best correlation with a known reference form.

The method according to the invention is characterised in that it comprises steps where radiation is received at a given frequency, in the received radiation, there is detected a first power peak and a second power peak, if the distance in time between said first and second power peaks is within the range [F-P1, F+P1], where F corresponds to frame period and P1 is a certain first error, there is made a preliminary decision that the signal is found, on the basis of the location in time of said first and second power peaks, a certain frame synchronisation point in time is defined, on the basis of said frame synchronisation point, said received radiation is searched for respective first and second parts corresponding to said reference sequence, by cross correlation with the known form of said reference sequence, there is detected a location in time for the best correlation corresponding to said first part in relation to said frame synchronisation point, and a location in time for the best correlation corresponding to said second part in relation to said frame synchronisation point, and if the location in time of the best correlation corresponding to said first part differs from the location in time of the best correlation corresponding to said second part in relation to said frame synchronisation point no more than for the quantity of a given second error, the final decision is that the signal is found.

The method of the invention proceeds step by step. Samples are picked of received radiation on a given carrier frequency, mixed to the baseband and filtered, and each of said samples corresponds to one symbol as for duration. For the estimation of the power profile, the receiver device records complex samples for the length of two frames and one slot and slides over them an estimation window having the length of one slot. Sliding is carried out in steps of one symbol, and every step produces a sample value which is the average of the single samples located in the window at each point of time. In mathematical terms it can be said that the result of the estimation is a convolution of the sample sequence and a unit function having the length of one slot, and this convolution is described with discrete values of the size of one symbol.

On the basis of the result from estimation, the receiver selects two highest power values from both recorded frames—presupposing that the two selected values are not located at immediately adjacent points of time, but there is a certain distance in between. The significance of this distance and the realisation of the selection process are explained in more detail below. If among the four chosen values there are found two with a mutual distance that corresponds to the frame length with sufficient accuracy, the receiver maintains that it has found in the frame the location of a regularly repeated high-power burst (in the above mentioned CCS carrier this means a BCCH burst). The found location is called the frame synchronisation point.

Because the two detected power peaks according to the presumption correspond to the high-power burst that was searched for, the receiver adjusts the automatic amplification level to be such that the average obtained for said two power peaks is equal to a nominal target value defined for the reception. The receiver calculates the noise level as follows: it first sums up the power averages (power average=the sum of the power values located in the estimation window and divided by the number of said values) corresponding to 25 successive non-overlapping locations of the estimation window and subtracts from the obtained sum the values of the power peaks. When necessary, other similar methods for calculating the noise power can also be used. Moreover, the receiver calculates the signal level by subtracting said noise level from the average of said two power peaks. The signal to noise ratio is defined as the quotient of the signal level and the noise level.

Next the receiver decides, on the basis of the signal to noise ratio, whether more frequency data must be received in order to estimate the frequency error. In a favourable situation, the signal to noise ratio is sufficiently good, and the receiver decides, on the basis of the detected high-power burst, which part of the recorded sample sequence describes frequency data contained in the transmission, and calculates a discrete fast Fourier transform on the basis of this. The obtained result is a given frequency spectrum, where the frequency point corresponding to the highest power value describes a frequency deviation from a desired frequency. If the frequency deviation is smaller than a given threshold value, advantageously one percentage of the symbol rate, the recorded sample sequence is accepted without corrections as a basis for the next step in the method. If the frequency deviation is larger than the threshold value mentioned above, but smaller than a given second threshold value, advantageously 10 percentage of the symbol rate, the receiver compensates by calculatory means the phase rotation which was caused in the samples of the recorded sample sequence owing to the frequency error. In another case, the receiver corrects the mixing frequency for the quantity of the frequency deviation and receives, mixes, filters and records two new signal lengths, each of which comprises the reference sequence of one BCCH as well as additional 30 samples at the beginning and end thereof.

In the last step of the method according to the invention, which step relates to a certain carrier frequency, the found location of the frame synchronisation point is adjusted so that the error is no more than +½ symbols. Of each recorded frame of the sample sequence, the receiver selects an area that extends, for the length of a given error margin, to both directions from the earlier calculated frame synchronisation point. In both frames, the estimation window of a given length is slided over the selected area, so that there are obtained two separate sequences of estimate values. In each sequence, there is detected the highest value and calculated its distance from a nominal frame synchronisation point. If the distances are equal or differ no more than for the length of one symbol, the correct frame synchronisation point is found.

If, on the basis of the steps described above, the receiver does not obtain an unambiguous synchronisation result, it concludes that there is no transmission at the carrier frequency in question, and continues searching at another carrier frequency. According to the area by area frequency division explained above, the first and foremost frequencies are those local frequencies that the receiver assumes to be used within its range of location. If a signal is not found, the search proceeds first to regional and then to global frequencies.

When the receiver has, by means of the method according to the invention, found a signal at a given frequency, the synchronisation proceeds to steps where the timing and frequency errors are further corrected and the error caused by phase rotation is diminished. An advantageous method for realising these steps is described in the Finnish patent application "Receiver synchronisation in idle mode", filed simultaneously with the present application by the same applicant.

BRIEF DESCRIPTION OF THE DRAWING

The invention is explained in more detail below, with reference to the preferred embodiments described by way of example, and to the appended drawings, where

FIG. 1 was already discussed above, in the description of the prior art, so that below, in the description of the invention and its preferred embodiments, mainly FIGS. 2–5 will be referred to.

DETAILED DESCRIPTION OF THE INVENTION

Figure 1:
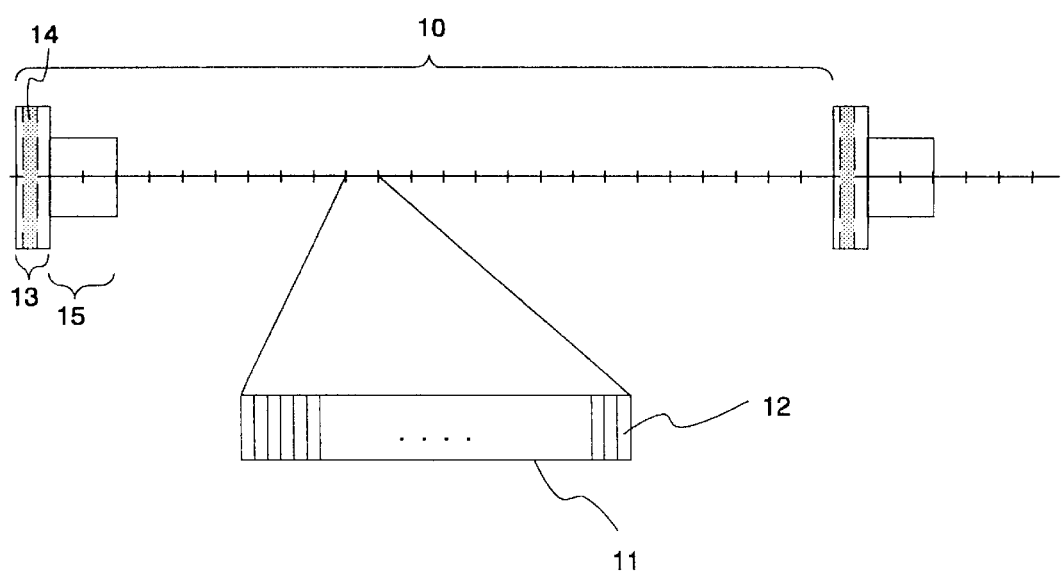
FIG. 1 illustrates a known division in time of a transmission in a CCS carrier of the I-CO Global Communications satellite telephone system.
Figure 2:
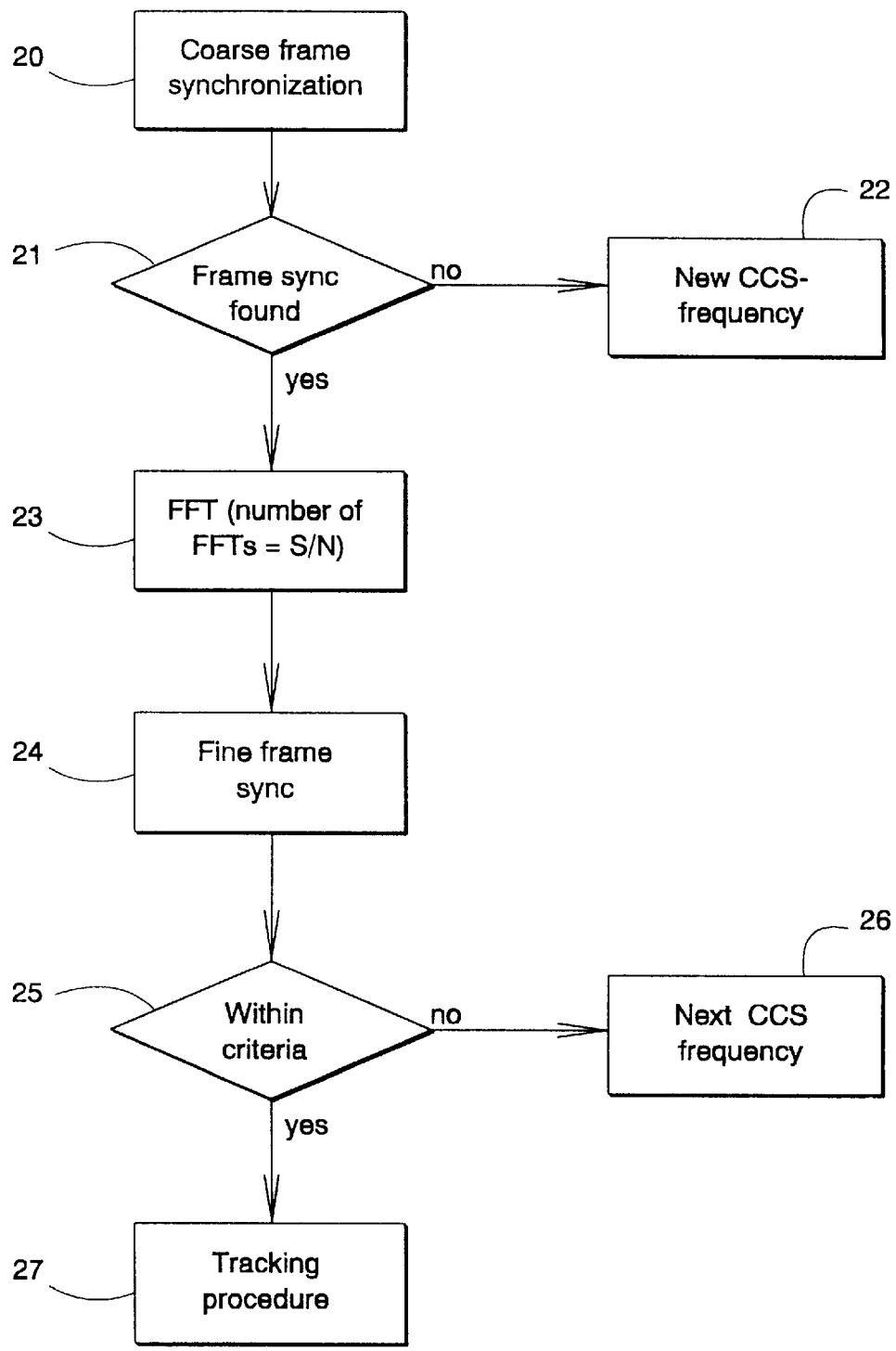
FIG. 2 illustrates the method according to the invention as a schematic flow chart.

FIG. 2 is a schematic flow diagram describing how the method according to the invention proceeds step by step. If the first step 20, the receiver attempts a coarse frame synchronisation at a given carrier frequency by detecting local power peaks in the recorded sample sequence and by comparing their mutual location. In the decision-making step 21 the receiver checks whether the coarse frame synchronisation has succeeded. If there is no receivable signal at the carrier frequency in question, the frame synchronisation fails and the receiver shifts to mode 22, where it selects another carrier frequency. If the coarse frame synchronisation has succeeded, the method of the invention proceeds to step 23, where the receiver calculates the discrete Fourier transform by using as initial data such part of the recorded sample sequence that contains frequency data connected to the carrier frequency in question. The number of the Fourier transforms to be calculated depends on the signal to noise ratio in a way that will be explained below. The step 24 of the method of the invention comprises an adjusted frame synchronisation, which makes use of the frequency correction rendered by the Fourier transforms, and where the location of the frame synchronisation point is attempted to be adjusted at the accuracy of half a symbol. In the decision-making step 25 the receiver checks whether the adjusted frame synchronisation has succeeded. If not, the result is a mode 26 similar to the mode 22—where a new carrier frequency is chosen. After successful adjusted frame synchronisation, the receiver can start reception and tracking in step 27.

Figure 3A:
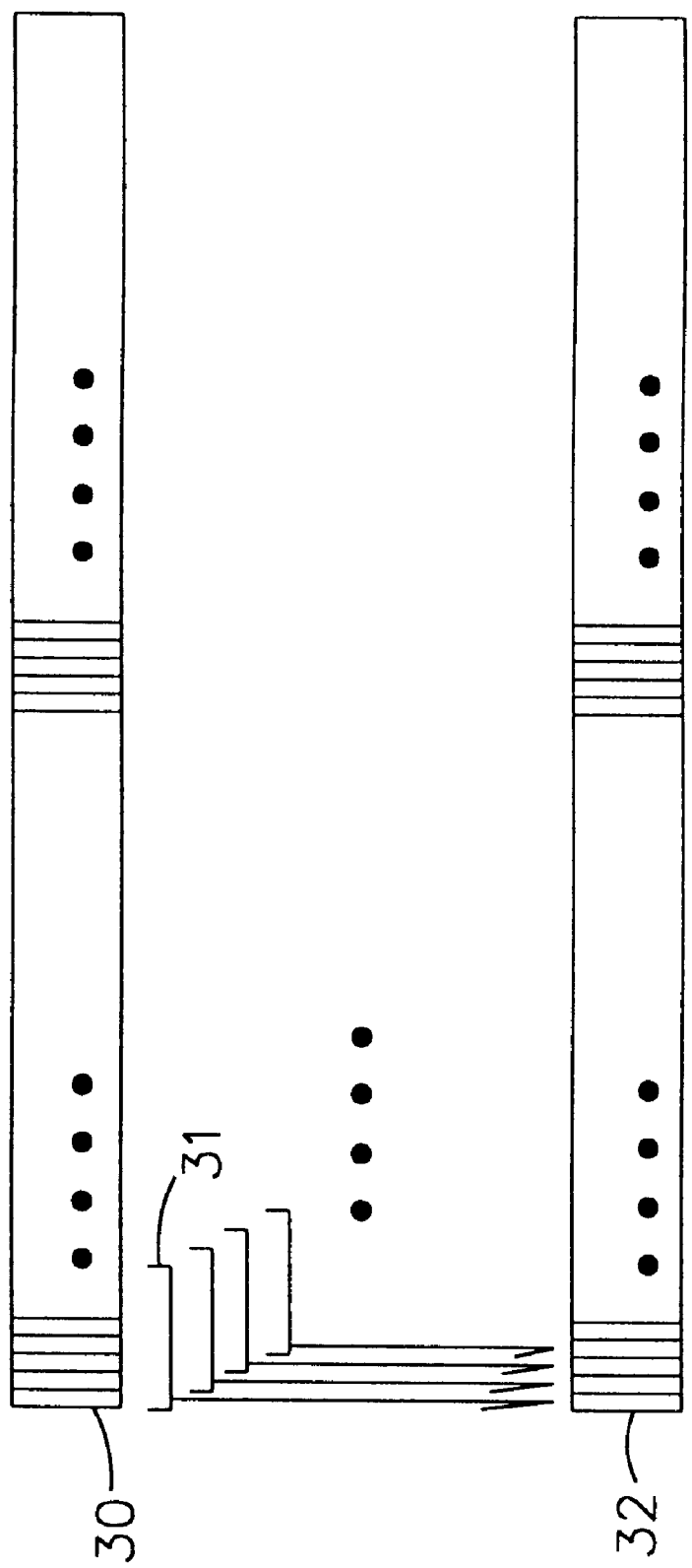
FIG. 3a illustrates a sample sequence recorded in the method of the invention and a window used in the estimation thereof, FIGS. 3b and 3c describe two different estimate sequences connected to the sample sequence of FIG. 3a, FIGS. 4a, 4b and 4c illustrate the steps of a more accurate frame synchronisation in the method of the invention.

Next we shall describe in more detail the realisation of the steps illustrated in FIG. 2, and concentrate, by way of example, particularly in features characteristic of the I-CO Global Communications satellite telephone system. FIG. 3a is a schematic illustration of a sample sequence 30, received and stored by the receiver device, with a length of two frames and one slot, in which sequence the sampling ratio is 1/1, i.e. the sequence contains as many samples as two frames and one slot contain symbols. The detailed creation of the samples will be dealt with later on. The sample sequence is essentially a series of measured values of received radio power, and its composition is affected both by received transmission and noise.

Figure 3B:
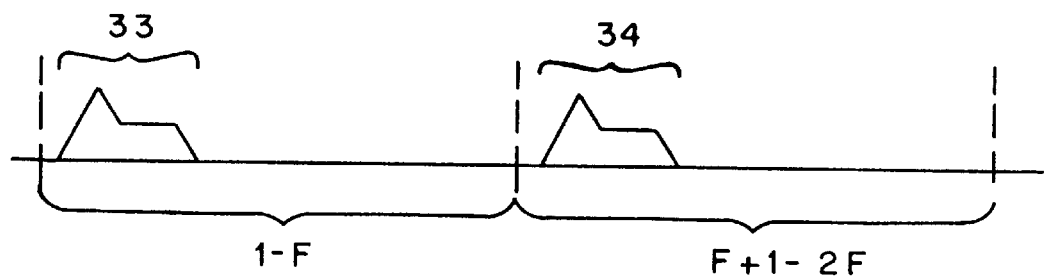

FIG. 3a also illustrates an estimation window 31, the length whereof is advantageously equal to the length of one slot (here 120 symbols), and which is slided past the sample sequence 30 at one-symbol-long steps. The obtained result is a number sequence 32, which here is called an estimate sequence and which contains as many estimates as there are symbols in two frames, but each estimate is an average of 120 successive samples (assuming that one slot contains 120 symbols). If the received sample sequence 30 would only contain received signal, with a one-slot-long BCCH burst and a successive lower power, two-slot-long FCH burst, the descriptor of the estimate sequence would consist of two bulges 33 and 34 formed of broken lines as illustrated in FIG. 3b. The power peak with both broken lines 33 and 34 is the estimate during the formation whereof a whole BCCH burst has been in the estimation window. In practice noise has accumulated in the signal while it has proceeded on the radio path, and the estimate sequence descriptor may look fairly irregular, as is the case in FIG. 3c. For the sake of clarity, in FIG. 3b the relative length of the broken lines 33 and 34 is exaggerated in comparison with the length of the part $1-F$ or $F+1^{-2F}$ corresponding to one frame in the descriptor of the estimate sequence.

The estimates can be numbered for reference for instance from 1 to 2F, where F is the number of estimates corresponding to one frame. Now the numbers from 1 to F refer to the first frame, and the numbers from F+1 to 2F refer to the second frame. In coarse frame synchronisation, the receiver detects, according to a preferred embodiment of the invention, in the area of both frames first the largest estimate and thereafter the next largest such estimate which is located at the distance of at least P1 from the largest estimate. The critical value P1 can be for instance a distance corresponding to the length of 50 samples. The receiver assumes that at least two of the thus obtained four values correspond to the power peak of two successive BCCH bursts, in which case the two other values are caused by noise. The values corresponding to the power peaks must be located at a distance of F±P1 samples from each other. Most advantageously the size of the critical value P1 is defined experimentally, because the lower the value of P1, the more accurately the power peaks must be identified irrespective of the noise accumulated in the signal. Respectively, the larger is P1, the easier it is to interpret two estimate peaks caused by pure noise to be power peaks caused by the signal. In calculatory simulations it has been found out that an advantageous P1 value is the above mentioned distance corresponding to the length of 50 samples. When selecting the largest values, it is also possible to pick from both frames one, three or several values in order of magnitude.

Figure 3C:
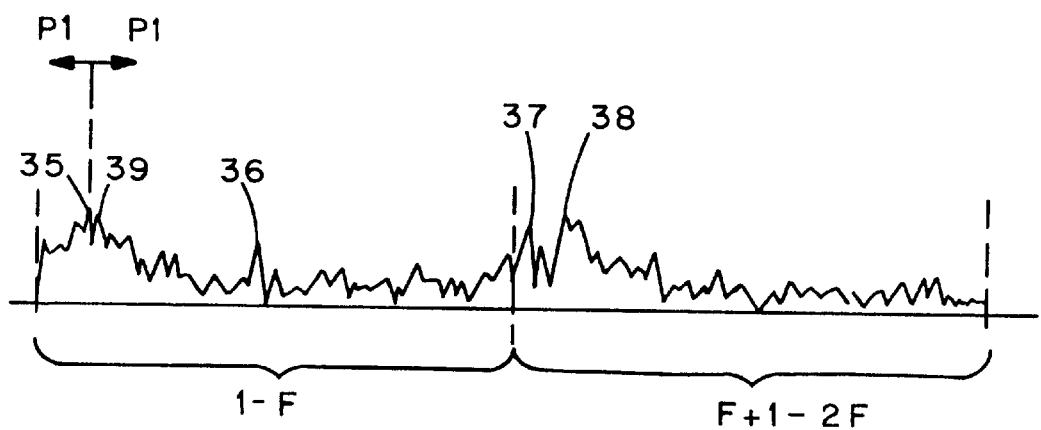

For example in FIG. 3c, there are selected estimates 35, 36, 37 and 38. Estimate 39 is not chosen, although it corresponds to a higher power value than estimate 36, because it is located at a distance less than ±P1 from the largest estimate 35 of the first frame. Thereafter the distances between the selected estimates 35–38 are compared in order to detect whether there is found a pair with a mutual distance within the range (F−P1; F+P1), borders included. In the case of FIG. 3c, the estimates 35 and 38 form such a pair. In the search for the pair, there is generally applied a given order, which can be for instance as follows:

first there are compared the highest values of both received frames;

then the highest value of the first frame is compared with the second highest value of the second frame;

next the second highest value of the first frame is compared with the highest value of the second frame;

next the second highest value of the first frame is compared with the second highest value of the second frame;

then the highest and second highest values of the first frame are compared with each other; and finally the highest and second highest values of the second frame are compared with each other.

If one of the steps in this order of comparison produces a pair where the distance between the estimates meets the above mentioned requirement, it is not necessary to go through the rest of the steps. In the case of FIG. 3c, the receiver selects the average of the locations of estimates 35 and 38 as a so-called frame synchronisation point. Moreover, the receiver calculates the average of the reception power indicated by these two estimates and adjusts the automatic gain control (AGC), included in the receiver circuits in a known fashion, so that the average of said reception power, as amplified by the determined gain control, gives a certain nominal power as a result. The receiver further calculates the signal power, noise power and the signal to noise ratio according to the procedure described above, or according to some other suitable calculation method.

Table 1 illustrates results from a calculatory simulation, where to the signal there is fed additive white gaussian noise (AWGN) in amounts that correspond to various signal to noise ratios (S/N); it is examined how large is the percentage of all attempts where the signal frame synchronisation is missed or false. For the distance P1 there is used value 50, and for the distance P2—describing how far from the real frame synchronisation point the calculated frame synchronisation point is allowed to be, for the frame synchronisation to be considered successful—there are used values 50 and 30.

The distance P2 is significant in step 23 of the method according to the invention, in which step the receiver calculates the frequency correction by utilising the frequency data contained in the received signal. If the error in the frame synchronisation point is no more than P2 symbols and the frequency data is included, in a known fashion, to a given received symbol sequence, it is recommendable to ignore P2 symbols at both ends of the sequence. Frequency correction is calculated from the received samples and not from the estimates, because estimation destroys frequency data. The receiver has recorded in the memory samples from two frames and one slot, altogether 6120 samples. It can be assumed that among these, the first is located in memory address E, and the calculated address of the frame synchronisation point is at a distance of D symbols from the beginning of the recorded sequence. Now the address of a first memory location wherefrom there is read a sample for calculating the frequency correction is E+D+the length of one slot (i.e. 120)+error margin P2. In a case where the calculated frame synchronisation point is very near to the middle of the sample sequence recorded in the memory (the distance of the frame synchronisation point from the beginning of the stored sample sequence is larger than the frame length minus the length of one slot), it can be concluded that in fact there is one FCH burst already at the beginning of the sample sequence. Now reading is started at a memory location with an address E+D+the length of one slot (i.e. 120)+error margin P2—the length of one frame (i.e. 3,000). Because the length of one FCH burst is 240 symbols, for calculating the frequency correction, there is read 240–(2*P2) samples starting from the initial memory location. Because the recorded sample sequence is two frames long, it also contains another FCH burst, the reading whereof is started one frame length later.

In the method according to the invention one memory location corresponds to one sample, and thus to one symbol (when the sampling ratio is 1/1); therefore it is obvious for a man skilled in the art that distances between samples can be treated as time units as well as memory addresses. The distance in time of two samples is the same as the difference of the respective memory addresses multiplied by the known duration of one symbol. The same applies for the above mentioned estimates. If the receiver device deals with the memory locations in other than direct successive order, this must be taken into account, when the distances between memory locations are transformed to distances in time or vice versa.

In table 1 it is seen that with the value 30 of P2, good results are obtained even when the signal to noise ratio falls somewhat below 0 dB, and hence the value P2=30 is used in the following. Now the receiver reads, for calculating frequency correction, 180 samples starting with the memory location explained above, and another set of 180 samples starting one frame length further. The discrete Fourier transform used in the calculation of frequency correction can in known circuit arrangements be carried out with 128 or 256 samples; thus the alternatives are either to further eliminate read samples, so that only 128 samples remain from each sequence, or to use padding as the rest of the values in the 256-sample Fourier transform. Simulation has shown that the latter alternative, i.e. adding zeroes to serve as samples 181–256 gives better results.

The receiver calculates the Fourier transform separately for both FCH sample sequences read from the memory. In simulation it has been found out that when the signal to noise ratio is below 0 dB, the reliability of frequency correction can be remarkably improved by receiving and mixing to baseband yet one additional sample sequence, from which there are read the 180 samples corresponding to a FCH burst in similar fashion as was described above, in relation to earlier recorded sample sequences. For the third sample sequence, there is likewise calculated a separate Fourier transform, as above. Respectively, in particularly good communication conditions, even one Fourier transform may suffice. If more than one Fourier transforms are calculated, they are averaged frequency component by component in order to reduce the effect of random errors. Moreover, the results of Fourier transforms can be slidably averaged by two, in order to bring out more clearly than before the FCH frequency possibly distributed evenly to adjacent frequency components, but this did not appear to be remarkably usefull in connection with the 256-sample Fourier transform.

As was maintained above, in the calculation of frequency correction there can be used Fourier transforms calculated from one, two or three FCH bursts. The values of the signal to noise ratio, on the basis of which values the receiver decides the number of the Fourier transforms to be defined, is most advantageously found by experimenting, but one suggestion was given, by way of example, in table 2. The AWGN channel means a channel where the influence of multipath transmission propagation is not significant, but the interference is mainly due to gaussian noise. In the Ricean type channel, multipath transmission propagation is a remarkable interference factor.

The result from the Fourier transform and possible averaging is a discrete frequency spectrum from –9 kHz to 9 kHz. The receiver detects in the spectrum the frequency component with the highest power value. This frequency represents the frequency deviation between the real FCH frequency and the frequency used in the baseband mixing. If the deviation is less than one percentage of the symbol rate, the calculation can be continued on the basis of recorded samples without calculatory corrections. The limit of one percent is defined through experimentation, and it can be replaced with some other critical value. If the deviation is within the range of 1%–10% of the symbol rate, the receiver calculates the resulting phase error per symbol in radians by multiplying the frequency deviation with $2\pi$ and by dividing the obtained product by the symbol rate. Thus the phase error contained in the recorded symbols and caused by the frequency deviation can be corrected by calculatory means. Also the 10 percent limit is found by experimentation and can be replaced by some other critical value. Information contained in samples recorded with larger deviations is, owing to erroneous mixing frequency, too distorted for further processing, wherefore the receiver must correct the mixing frequency (by subtracting from the original mixing frequency the frequency deviation given by the Fourier spectrum) and receive, mix and record a number of samples corresponding to two new reference sequences of the BCCH burst. Owing to the error margin observed in the calculation of the frame synchronisation point, new data must be recorded for the amount of P2 samples in addition to the reference sequences of the assumed BCCH bursts, both at the beginning and end of said bursts.

Figure 4A:
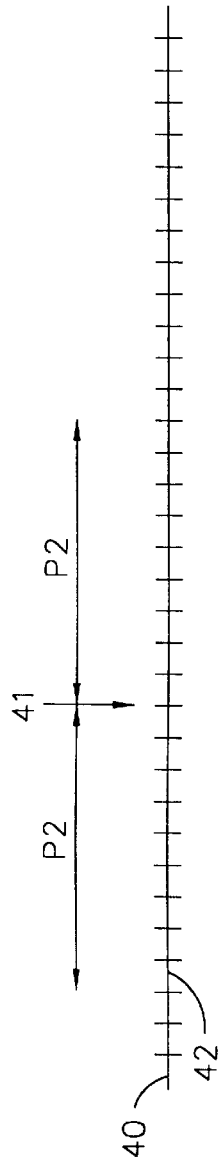
Figure 4B:
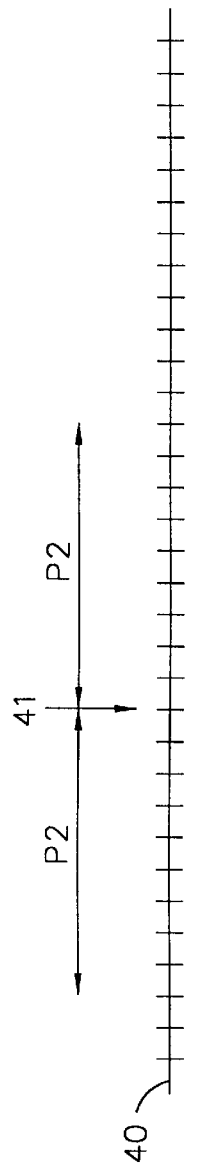
Figure 4C:
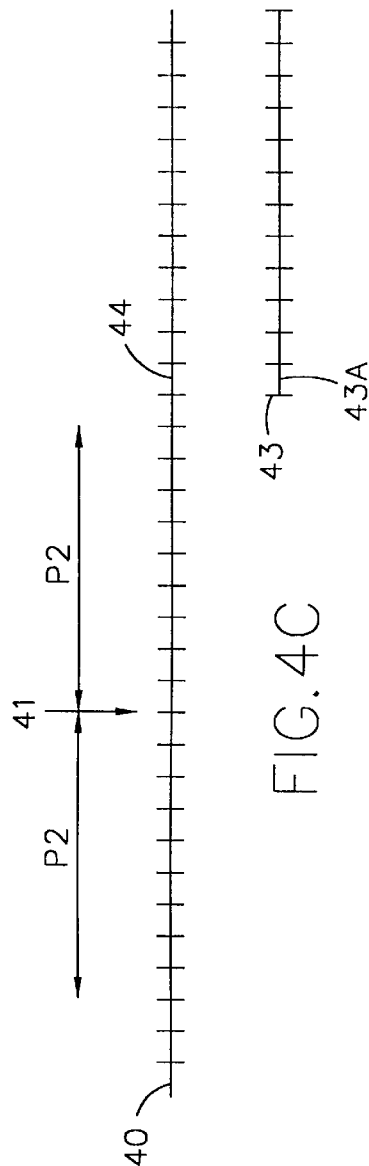

In step 24 of the invention, the receiver tries to reduce the synchronisation error from P2 (30 symbols) to the required ±½ symbols, by searching in the recorded BCCH bursts a point which best correlates with the known reference sequence. As was maintained above, in the description of the prior art, the reference sequence is a certain 32 symbols long repeated symbol sequence with a known location within the BCCH burst. The correct form of the reference sequence is stored, as a 32 symbols long sequence, in the non-volatile memory of the receiver. Irrespective of whether the receiver uses samples that were recorded earlier or has received new samples after frequency correction, it detects, on the basis of the known location of the calculated frame synchronisation point and the reference sequence, the assumed starting point of the reference sequence in each BCCH burst. In FIGS. 4a–4c, part of the sample sequence is represented as a line 40, and the assumed starting point of the reference sequence is represented as an arrow 41.

Because the error margin of the calculated frame synchronisation point still is ±P2 symbols, the correlation comparison is started, according to FIG. 4a, from sample 42, which is located at P2 symbols before the assumed starting point 41 of the reference sequence. In the first correlation step, the receiver multiplies, according to FIG. 4a, this complex sample 42 with the first symbol 43a of the known reference sequence 43, the next sample with the next symbol of the known reference sequence, and so on throughout the whole length of the known reference sequence. The obtained complex products are added up, and the power of this sum is calculated and stored. In the next correlation step, the known reference sequence is shifted, according to FIG. 4b, one symbol length further in relation to the sample sequence 40, and the same multiplication, addition and power calculation procedure is repeated. The same procedure is applied as far as sample 44, which according to FIG. 4c is located at P2 symbols after the assumed starting point of the reference sequence. The obtained result is 2*P2+1 power values, which describe the correlation of the known reference sequence with the received sample sequence at ±P2 symbols on both sides of the assumed starting point of the reference sequence.

The correlation calculations according to FIGS. 4a–4c are carried out separately for both observed BCCH bursts. For both bursts, the highest of the obtained power values corresponds to that point in the sample sequence 40 where a sequence of 32 successive samples best corresponds to a known reference sequence. The distance of this point from the earlier calculated nominal starting point of the reference sequence should be identical in both observed BCCH bursts. If the difference of the distances calculated on the basis of separate bursts is −1, 0 or 1 symbol, it can be assumed that the correct location of the reference sequence is found. The value 0 of the difference naturally means that a sequence with the highest power value is found in both bursts at exactly the same point with respect to the calculated frame synchronisation point. The difference −1 or 1 corresponds to a situation where the locations of the reference sequence calculated on the basis of separate BCCH bursts differ for one symbol to either direction. This may be due to the fact that in the A/D conversion, connected to the processing of the received signal in a known fashion, the border of the digital sampling window falls very near to the middle of a received real symbol, in which case incidental error factors define to which side of the border of said sampling window the power used for transmitting said real symbol is predominantly directed.

If the difference of the values describing the distance between the real and nominal location of the reference sequence, calculated from the BCCH bursts, has an absolute value larger than or equal to 2 symbols, the frame synchronisation has failed. The reason in the background can be one of the following:

the studied frequency does not, after all, carry a real signal, but an erroneous decision was made in earlier coarse frame synchronisation, the previously calculated frame synchronisation point is located further than at P2 symbols from the real frame synchronisation point, the frequency correction calculated by means of the Fourier transforms was wrong, or the symbol synchronisation calculation based on the reference sequence has failed.

Among these, the most probable is the first alternative.

In the above specification, we have mainly discussed a preferred embodiment of the method according to the invention, but it is obvious for a man skilled in the art that modifications and additions can be made thereto without departing neither from the inventional idea introduced in this application, nor from the scope of the claims enlisted below. One possibility for modification is connected to the power peak values chosen in the coarse frame synchronisation (step 20 in FIG. 2) and their treatment. In favourable reception conditions, there can be used a so-called single shot acquisition, where the receiver records a sample sequence having the length of one frame +one slot only, and calculates the estimates on the basis of that according to the procedure described above. The estimate corresponding to the highest power value is chosen as the frame synchronisation point, and by means of that, there is detected a nominal starting point for the FCH burst; starting from this (subtracted by the safety margin P2), the frequency samples are read in order to calculate the Fourier transform. If the calculated frequency error proves out to be larger than one percent of the symbol rate, the receiver corrects the mixing frequency and receives a new BCCH burst. Thereafter the receiver calculates from the frame synchronisation point the starting point of the reference sequence and detects a more accurate frame synchronisation by studying the correlation of successive symbol sequences with the known reference sequence. The single shot acquisition saves some time and signal processing capacity, if the reception conditions are sufficiently good. If the receiver first attempts a single shot acquisition, but then decides that the signal to noise ratio is too bad, it must receive, filter, mix and record new sample sequences, which means that there is used more time than if at least two bursts were used as the basis for calculations already in the first attempt.

In coarse frame synchronisation, the target of observation can also be some other amount of power peak values than the above mentioned two values per frame. From the two frames long estimate sequence, the receiver can select nearly any number of peak values and use any combination in order to find a pair where the mutual order of the values corresponds, with desired accuracy, to the length of one frame. It is, however, pointed out that the larger the group of values that is chosen as the starting point in the selection of the frame synchronisation point, the higher the probability that some sudden power peak caused by noise is erroneously interpreted as a BCCH burst.

When the more refined frame synchronisation (step 24 in FIG. 2) gives the calculated location of the reference sequence in successive bursts, so that the difference is one symbol to one direction or the other, the underlying ambiguity caused by the sampling technique can be clarified by many different ways. For example, the receiver can first process side by side two different signals synchronised according to different frame synchronisation points, whereafter that frame synchronisation point which gives better results is chosen as the final point. Another alternative is to shift the above mentioned digital sampling window forward or backward for half a symbol and then to study whether this improves the signal quality. If the shift took place in a wrong direction, the frame synchronisation point is shifted to the opposite direction for the length of one whole symbol.

Figure 5:
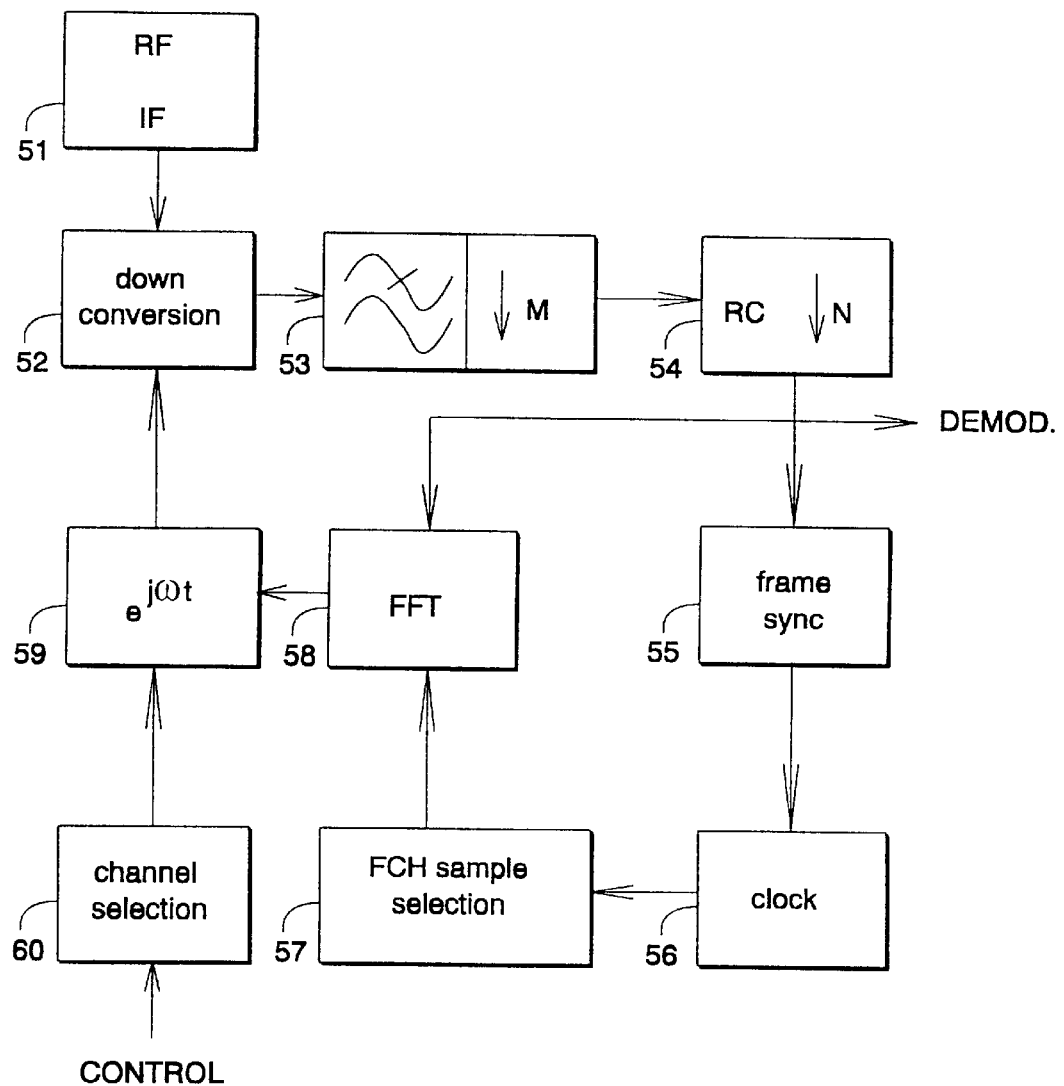
FIG. 5 is a block diagram of a radio receiver that can be used for realising the method of the invention.

Next we shall describe an exemplary radio receiver that can be used for realising the method according to the invention. FIG. 5 illustrates in block diagram a radio receiver 50, where the radio frequency and intermediate frequency parts represent the state of the art and are illustrated as one block 51 only. The intermediate frequency part produces at its output a signal which is mixed to baseband in the downconversion block 52, which essentially contains an A/D converter and a digital mixer (not illustrated separately in the drawing). In the downconversion, there is advantageously applied eightfold oversampling, so that the output of block 52 contains an eightfold number of samples as compared to the known symbol rate of the signal. The blocks 53 and 54 comprise underpass filtering and decimation parts, which remove interfering frequencies from the signal and reduce oversampling, until there is only one sample per symbol left in the signal. The frame synchronisation block 55 comprises parts corresponding to the above (in FIG. 2) described steps 20, 21, 24 and 25, which parts implement the frame synchronisation. The clock block 56 controls the synchronisation of the operation and for instance counts received symbols, even when they are not properly processed owing to the time used in the synchronisation process, so that the location of the frame synchronisation point after detection is up to date in relation to the received signal stream, irrespective of the length of time used in the frame synchronisation.

The clock block 56 also gives the synchronisation data for the windowing block 57, which determines which samples are selected as the basis for calculating the Fourier transforms. The block 58 calculates the Fourier transforms (FFT) proper, and on the basis of the obtained results, the mixing frequency in block 59 is adjusted. The formation of the mixing frequency is part of the channel selection, which is controlled by the control block CTRL of the whole system by intermediation of the channel selection block 60. The signal to be demodulated is picked, after finding the frame synchronisation, from between the decimation block 54 and the frame synchronisation block 55. Because the signal processing operations illustrated in FIG. 5 are directed to the digital signal following the A/D conversion after the downconversion, they are advantageously realised as programmatic processes carried out by a digital signal processor (DSP). DSP programming and the planning of the processes corresponding to the blocks of FIG. 5 both represent prior art technology known as such for a man skilled in the art.

The method according to the invention introduces a quick and reliable way for signal acquisition in a system where the receiver must find the signal from a group of several frequencies and synchronise to the signal by means of the rhythmic pattern of the transmission in a known control channel. The method requires that only about 6.000 samples are recorded for processing, which does not set inordinate demands for the equipment. The method according to the invention is also easily suited for various different reception environments, because the number of recorded and treated signal frames can be varied according to the prevailing signal to noise ratio.

TABLE 1

| S/N, dB | Missed detection percentage/% P1 = 50 | False detection percentage/% P2 = 50 | False detection percentage/% P2 = 30 |
|---|---|---|---|
| −4 | 20, 1 | 2, 3 | 20 |
| −2 | 2 | 0, 56 | 1, 7 |
| 0 | 0 | 0, 1 | 0, 25 |
| 2 | 0 | 0 | 0 |
| 4 | 0 | 0 | 0 |

TABLE 2

| FFT number | AWGN channel | Ricean channel |
|---|---|---|
| 1 | S/N > 4 dB | S/N > 6 dB |
| 2 | 0 dB ≦ S/N ≦ 4 dB | 1,5 dB ≦ S/N ≦ 6 dB |
| 3 | S/N < 0 dB | S/N < 1, 5 dB |

What is claimed is:

1. A method for acquiring a signal in a receiver, the signal being contained in a given channel and comprising:

a control burst (13) repeated at regular intervals within a given frame period (10), which burst contains a reference sequence (14) with a predetermined form, and a frequency data part (15) having a lower power level than the control burst, the method comprising steps wherein there is received radiation at a certain frequency, in the received radiation, there is detected (20) a first power peak (35) and a second power peak (38), if the mutual difference in time of said first and second power peaks is within the range {F-P1, F+P1}, where F corresponds to said frame period and P1 is a certain first error, there is made a preliminary decision (21) that the signal is found, there is defined (24), on the basis of the location in time of said first and second power peaks, a given frame synchronization point in time, on the basis of said frame synchronization point, in the received radiation there is detected a first and second part corresponding to said reference sequence (43), there is detected, by the method of cross correlation with the known form of said reference sequence, the location in time of the best correlation corresponding to said first part, in relation to said frame synchronization point, and the location in time of the best correlation corresponding to said second part, in relation to said frame synchronization point, and if the location in time of the best correlation corresponding to said first part differs from the location in time of the best correlation corresponding to said second part in relation to said frame synchronization point no more than for the length of a given second error, there is made a final decision (25) that the signal is found.

2. A method for acquiring a signal in a receiver, the signal being contained in a given channel and comprising:

a control burst (13) repeated at regular intervals within a given frame period (10), which burst contains a reference sequence (14) with a predetermined form, and a frequency data part (15) having a lower power level than the control burst, the method comprising steps wherein there is received radiation at a certain frequency, in the received radiation, there is detected (20) a first power peak (35) and a second power peak (38), if the mutual difference in time of said first and second power peaks is within the range {F-P1, F+P1}, where F corresponds to said frame period and P1 is a certain first error, there is made a preliminary decision (21) that the signal is found, there is defined (24), on the basis of the location in time of said first and second power peaks, a given frame synchronization point in time, on the basis of said frame synchronization point, in the received radiation there is detected a first and second part corresponding to said reference sequence (43), there is detected, by the method of cross correlation with the known form of said reference sequence, the location in time of the best correlation corresponding to said first part, in relation to said frame synchronization point, and the location in time of the best correlation corresponding to said second part, in relation to said frame synchronization point, if the location in time of the best correlation corresponding to said first part differs from the location in time of the best correlation corresponding to said second part in relation to said frame synchronization point no more than for the length of a given second error, there is made a final decision (25) that the signal is found, on the basis of the location in time of said frame synchronization point, in the received radiation there also is detected a third part corresponding to said frequency data part (15), and on the basis of the contents of the third part, there is defined (23), on the basis of the contents of said third part, the frequency error between the frequency used in the reception and the real frequency of the signal.

3. A method according to claim 2, wherein on the basis of the location in time of said frame synchronization point, in the received radiation there also is detected a fourth part corresponding to said frequency data part, and on the basis of the contents of said third and fourth parts, there is defined the frequency error between the frequency used in the reception and the real frequency of the signal.

4. A method for acquiring a signal in a receiver, the signal being contained in a given channel and comprising:

a control burst (13) repeated at regular intervals within a given frame period (10), which burst contains a reference sequence (14) with a predetermined form, and a frequency data part (15) having a lower power level than the control burst, the method comprising steps wherein there is received radiation at a certain frequency, in the received radiation, there is detected (20) a first power peak (35) and a second power peak (38), if the mutual difference in time of said first and second power peaks is within the range {F-P1, F+P1}, where F corresponds to said frame period and P1 is a certain first error, there is made a preliminary decision (21) that the signal is found, there is defined (24), on the basis of the location in time of said first and second power peaks, a given frame synchronization point in time, on the basis of said frame synchronization point, in the received radiation there is detected a first and second part corresponding to said reference sequence (43), there is detected, by the method of cross correlation with the known form of said reference sequence, the location in time of the best correlation corresponding to said first part, in relation to said frame synchronization point, and the location in time of the best correlation corresponding to said second part, in relation to said frame synchronization point, if the location in time of the best correlation corresponding to said first part differs from the location in time of the best correlation corresponding to said second part in relation to said frame synchronization point no more than for the length of a given second error, there is made a final decision (25) that the signal is found, and in order to detect said first and second power peaks, the received radiation is searched for at least four power peaks (35, 36, 37, 38), and it is required that among these, no two power peaks are closer to each other in time than a given first marginal value (P1).

5. A method according to claim 4 wherein said first marginal value is the same as said first error (P1).

6. A method for acquiring a signal in a receiver, the signal being contained in a given channel and comprising:

a control burst (13) repeated at regular intervals within a given frame period (10), which burst contains a reference sequence (14) with a predetermined form, and a frequency data part (15) having a lower power level than the control burst, the method comprising steps wherein there is received radiation at a certain frequency, in the received radiation, there is detected (20) a first power peak (35) and a second power peak (38), if the mutual difference in time of said first and second power peaks is within the range {F-P1, F+P1}, where F corresponds to said frame period and P1 is a certain first error, there is made a preliminary decision (21) that the signal is found, there is defined (24), on the basis of the location in time of said first and second power peaks, a given frame synchronization point in time, on the basis of said frame synchronization point, in the received radiation there is detected a first and second part corresponding to said reference sequence (43), there is detected, by the method of cross correlation with the known form of said reference sequence, the location in time of the best correlation corresponding to said first part, in relation to said frame synchronization point, and the location in time of the best correlation corresponding to said second part, in relation to said frame synchronization point, if the location in time of the best correlation corresponding to said first part differs from the location in time of the best correlation corresponding to said second part in relation to said frame synchronization point no more than for the length of a given second error, there is made a final decision (25) that the signal is found, and said frame period also is divided to a predetermined number of slots (11) with a standard length, and said control burst (13) has the length of one slot, wherein for the foregoing steps, there is received, filtered, mixed to baseband and recorded in the form of samples a sequence of radiation which essentially has the length of two frame periods and one slot.

7. A method according to claim 6, wherein in order to search for said first and second power peaks in the recorded data, there is calculated a number of estimates (32), of which each estimate is a sliding power average of N successive samples, where N is the number of samples recorded per one slot, and said number of estimates is divided into estimates calculated from the first frame period and estimates calculated from the second frame period, in which case said first and second power peak are chosen so that among the estimates calculated from the first frame period, there is chosen the largest estimate (35) and such next largest estimate (36), the distance of which from the largest estimate is longer than said first error (P1), among the estimates calculated from the second frame period, there is chosen the largest estimate (38) and such next largest estimate (37), the distance of which from the largest estimate is longer than said first error, among the chosen four estimates, there are selected two such estimates (35, 38) the mutual difference in time of which falls within the range {F-P1, F+P1}.

8. A method according to claim 7, wherein in order to select said two estimates, the mutual difference in time of which falls within the range {F-P1, F+P1}, said four chosen estimates are compared pair by pair in the following order:

the largest estimate calculated from the first frame period and the largest estimate calculated from the second frame period, and next if necessary the largest estimate calculated from the first frame period and the second largest estimate calculated from the second frame period, and next if necessary the second largest estimate calculated from the first frame period and the largest estimate calculated from the second frame period, and next if necessary the second largest estimate calculated from the first frame period and the second largest estimate calculated from the second frame period, and next if necessary the largest and second largest estimate calculated from the first frame period, and next if necessary the largest and second largest estimate calculated from the second frame period.

9. A method according to claim 6, wherein there also is defined a signal to noise ratio by calculating the noise level by defining a power average for the single-slot sample sequences and by subtracting therefrom the sum of said first and second power peak, the signal level by dividing the power sum of said first and second power peaks by two, and the signal to noise ratio by dividing said signal level by said noise level.

10. A method according to claim 9, wherein if said signal to noise ratio is found to be higher than a given first threshold value, from a recorded sample sequence corresponding to the length of two frame periods, there is read a first frequency sample sequence corresponding to one separate frequency data part, on the basis of said first frequency sample sequence, there is calculated a first Fourier transform, from the obtained Fourier transform, there is selected a frequency corresponding to the frequency component with the highest power to be the correction frequency, if said correction frequency is higher than a given first critical value, there is formed a new mixing frequency for mixing the signal to baseband by subtracting said correction frequency from the old mixing frequency, and if said correction frequency is lower than said first critical value but higher than a second critical value, at least part of the samples contained in the recorded sample sequence are corrected by a phase correction which is comparable to said correction frequency.

11. A method according to claim 10 wherein in accordance to uncertainty in the location in time of said frame synchronization point, there is set another given marginal value (P2), and in order to read said frequency sample sequences the nominated beginning and end of the frequency data part in the recorded sample sequence are defined by calculating from said frame synchronization point, the reading of each frequency sample sequence is started at a point of the recorded sample sequence which equals to the nominal beginning of said frequency data part added by said second marginal value, and the reading of each frequency sample sequence is stopped at a point in the recorded sample sequence which equals to the nominal end of said frequency data part as subtracted by said second marginal value.

12. A method according to claim 9, wherein if said signal to noise ratio is detected to be lower than a given first threshold value but higher than another given threshold value, from the recorded sample sequence corresponding to two frame periods, there are read a first frequency sample sequence and a second frequency sample sequence corresponding to a separate frequency data part, on the basis of said first frequency sample sequence, there is calculated a first Fourier transform, and on the basis of said second frequency sample sequence a second Fourier transform, there is calculated an average of the powers of said first and second Fourier transform, from the obtained average, there is selected a frequency corresponding to the frequency component with the highest power as the correction frequency, if said correction frequency is higher than a given first critical value, there is formed a new mixing frequency for mixing the signal to baseband by subtracting said correction frequency from the old mixing frequency, and if said correction frequency is lower than said first critical value, but higher than another given critical value, at least part of the samples in the recorded sample sequence are corrected by phase correction, which is proportional to said correction frequency.

13. A method according to claim 9, wherein if said signal to noise ratio is detected to be lower than another given threshold value, there is received, filtered, mixed to baseband and recorded as samples, in addition to the already recorded sample sequence, a radiation sequence essentially corresponding to the frequency data part of the third frame period, from the recorded sample sequences, there are read a first frequency sample sequence, a second frequency sample sequence and a third frequency sample sequence corresponding to three separate frequency data parts respectively, on the basis of said first frequency sample sequence, there is calculated a first Fourier transform, on the basis of said second frequency sample sequence, there is calculated a second Fourier transform and on the basis of said third frequency sample sequence, a third Fourier transform, an average of said first, second and third Fourier transforms is calculated by each frequency component, from the obtained average, there is selected a frequency corresponding to the frequency component with the highest power as the correction frequency, if said correction frequency is higher than a given first critical value, there is formed a new mixing frequency for mixing the signal to baseband by subtracting said correction frequency from the old mixing frequency, and if said correction frequency is lower than said first critical value, but larger than a given second critical value, at least part of the samples contained in the recorded sample sequence are corrected by phase correction, which is proportional to said correction frequency.

14. A method for acquiring a signal in a receiver, which signal is contained in a given channel and includes a control burst repeated at regular intervals with the length of a given frame period, the control burst containing a reference sequence with a predetermined form, as well as a frequency data part with a lower power value than the control burst, wherein the method comprises the following steps, where there is received radiation at a given frequency, in the received radiation, there is detected a power peak describing the highest received power, on the basis of the location in time of said power peak, there is defined a frame synchronization point in time, on the basis of correlation in content, in said received radiation there is detected the part corresponding to said reference sequence, and if the location in time of said part corresponding to said reference sequence, defined on the basis of correlation in content, in relation to said frame synchronization point, differs from the nominal location in time calculated for the reference sequence with respect to said frame synchronization point no more than for the length of a given another error, it is concluded that the signal is found.

15. A method for acquiring a signal in a receiver, the signal being contained in a given channel and comprising a burst portion repeated at regular intervals within a given frame period, the burst portion containing a reference sequence having a predetermined form, wherein the signal further comprises a frequency data part having a lower power level than a power level of the burst portion, the method comprising steps of:

receiving radiation at a specific frequency;

detecting in the received radiation a plurality of power peaks by an estimation process, said estimation process including an obtaining of a set of samples of the signal over an interval of time greater than the interval of two frames of the signal, and examining the sample sequence with a sliding estimation window having a time duration of one slot of a frame of the signal;

selecting from the power peaks a first power peak and a second power peak spaced apart by a time distance equal to the duration of said frame plus an error having a value less than a predetermined error;

defining, on the basis of a location in time of said first and second power peaks, a given frame synchronization point in time;

on the basis of said frame synchronization point, finding in the received radiation the frequency data part of said reference sequence; and determining the frequency of the radiation from the frequency data part.

* * * * *